United States Patent [19]

Vural et al.

[11] 4,121,472

[45] Oct. 24, 1978

[54] ECCENTRIC DRIVE

[75] Inventors: Gülertan Vural, Emmelshausen; Udo Carle, Hohr-Grenzhausen, both of Fed. Rep. of Germany

[73] Assignee: Koehring GmbH - Bomag Division, Boppard, Fed. Rep. of Germany

[21] Appl. No.: 745,452

[22] Filed: Nov. 26, 1976

[30] Foreign Application Priority Data

Nov. 29, 1975 [DE] Fed. Rep. of Germany ....... 2553800

[51] Int. Cl.[2] .............................................. F16H 33/10

[52] U.S. Cl. ................................ 74/87; 192/85 AT; 192/105 A; 209/366.5; 366/108

[58] Field of Search ............................. 74/64, 86, 87; 259/DIG. 42, 1 R; 209/366.5; 192/105 A, 85 AT

[56] References Cited

U.S. PATENT DOCUMENTS

| | | | |
|---|---|---|---|
| 2,213,383 | 9/1940 | Canfield | 192/85 AT |
| 2,250,327 | 7/1941 | Criner | 192/85 AT |
| 2,277,554 | 3/1942 | McCoy | 192/85 AT |
| 2,930,244 | 3/1960 | Hutchinson et al. | 74/87 |
| 3,097,537 | 7/1963 | Peterson | 74/87 |
| 3,771,374 | 11/1973 | Choules | 259/DIG. 42 |
| 3,810,394 | 5/1974 | Novak | 74/87 |
| 4,033,193 | 7/1977 | Brander | 74/87 |

FOREIGN PATENT DOCUMENTS

| | | | |
|---|---|---|---|
| 1,158,429 | 11/1963 | Fed. Rep. of Germany | 74/87 |
| 137,805 | 8/1961 | U.S.S.R. | 74/87 |

*Primary Examiner*—C. J. Husar
*Attorney, Agent, or Firm*—Spencer & Kaye

[57] ABSTRACT

In an eccentric drive system including a rotatably mounted driven shaft, at least one primary eccentric mass fixed to the driven shaft for rotation therewith, an additional eccentric mass mounted for rotation with the shaft in a manner to permit periodic adjustment of the angular position of the additional mass relative to that of the primary mass, the shaft is provided with a shaft portion presenting an outer periphery which is arranged eccentrically to the axis of rotation of the shaft, the additional mass is mounted on the shaft portion to be angularly movable relative to that portion, and the system is further provided with a spring element connected between the additional mass and the shaft for producing a force about the axis of the shaft urging the additional mass into an initial angular position relative to the shaft, and with a fastening unit disposed between the shaft and the additional mass and actuatable between a released position in which it permits the additional mass to undergo angular displacement relative to the shaft and a locking position in which it prevents such displacement.

14 Claims, 10 Drawing Figures

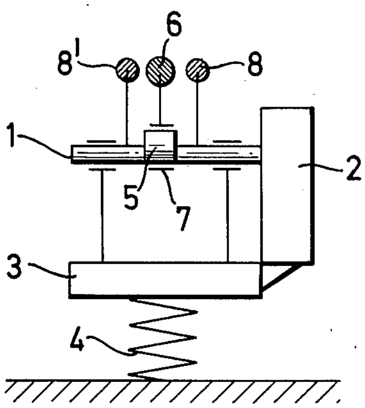
FIG. 1
FIG. 2
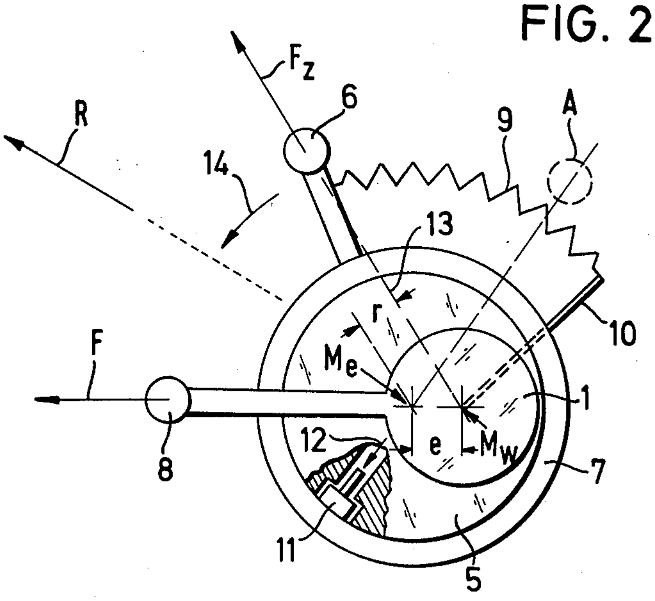

FIG. 3a
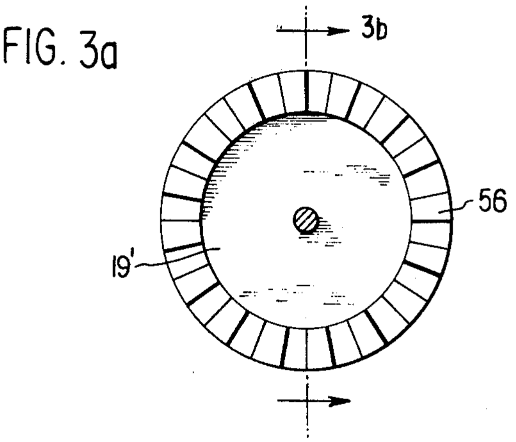
FIG. 3b
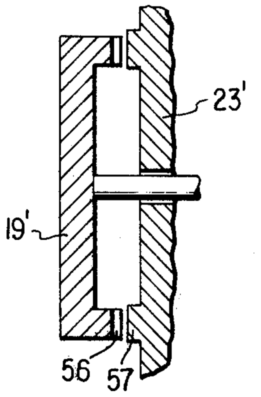
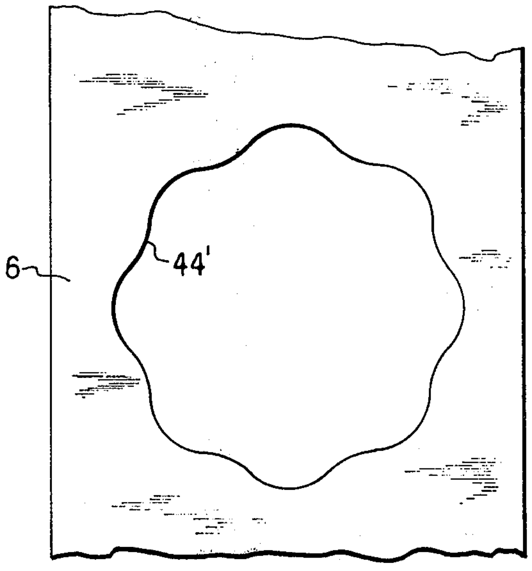
FIG. 5a
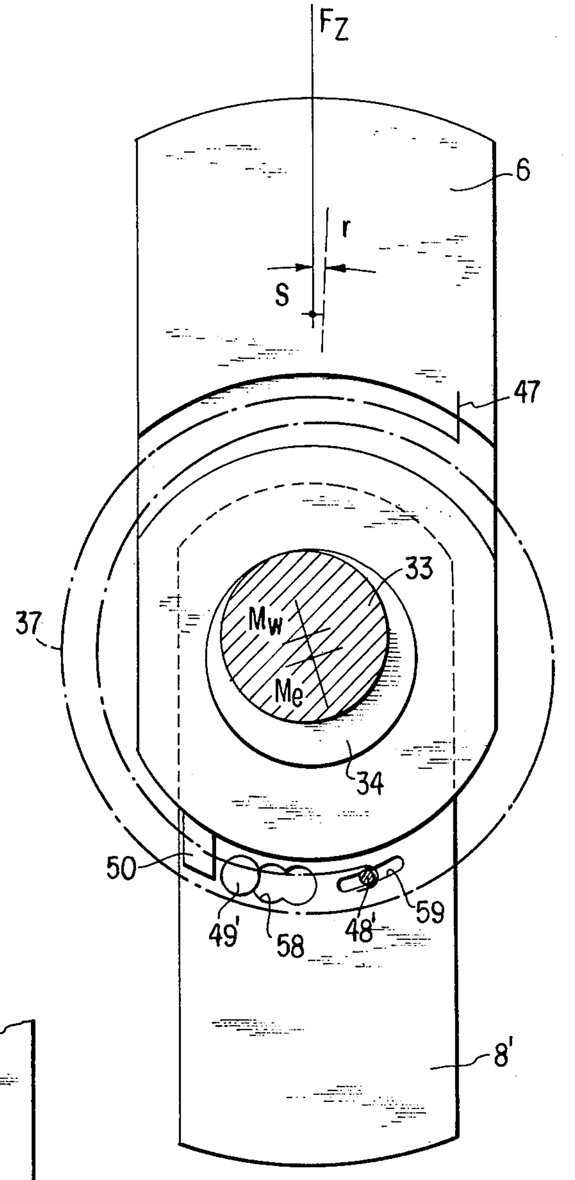
FIG. 6a

ECCENTRIC DRIVE

BACKGROUND OF THE INVENTION

The present invention relates to an eccentric drive of the type having at least one eccentric mass which is permanently fastened to a driven shaft and at least one additional mass which can be rotated on the shaft relative to the eccentric mass and fixed at any desired angular position.

Eccentric drives are known in the art and are used in a number of industrial fields, for example for vibratory conveyors, vibratory screens, shaking tables, ground compactors, etc. It is also known, in this connection, to associate an additional mass with the eccentric mass and to connect the additional mass with the eccentric mass in such a manner that at a given rate of rotation of the eccentric mass, it is possible to vary the excitation force acting on the assembly to be driven by adjusting the angular position between the eccentric mass and the additional mass. In this manner the system can be adapted to the existing requirements.

In systems requiring constant operation it is customary to rotatably mount the additional mass on the shaft which carries the eccentric mass and to permanently screw together the eccentric mass and the additional mass by means of a calibrated series of holes in one of the masses. Once the optimum setting has been found with such arrangement, no further adjustment of the two masses with respect to one another need be made.

The situation is different, however, for machines where changes occur in the conditions of use, and thus in the operating conditions to which the drive assembly is subjected, be it with respect to the required driving frequency or with respect to the required driving power. Changes in required driving power occur, for example, during the operation of vibratory conveyors or vibratory screening devices handling a variety of loads or materials, and during the operation of ground compactors or the like. In such cases it is necessary to readjust the operating frequency and/or the excitation force, and this if possible by "pushing a button".

While a change in operating frequency can easily be effected by simple changing the rotation speed of the eccentric mass, it has not heretofore been possible to similarly vary the excitation force, i.e. the angular positions of the eccentric mass and the additional mass with respect to one another, in a satisfactory manner. A mechanism for effecting such angular position variation by means of gears, for example planet gears or worm gears, would entail considerable expenditures and time since, in any case, it must be taken into account, that the entire assembly, i.e. all of the individual parts of the gear assembly, will vibrate along with the eccentric drive and will therefore be subject to considerable inertial forces which must also be considered in the design of the system.

SUMMARY OF THE INVENTION

It is therefore an object of the present invention to provide an eccentric drive of the above-mentioned type which has a sturdy structure, is operational dependable, and permits simple and rapid changes in the position of the additional mass with respect to the eccentric mass to adapt it to the changing operating conditions.

This and other objects are accomplished, asscording to the present invention, by providing the driven shaft with a section which is eccentric with respect to the axis about which the shaft rotates, the additional mass being rotationally mounted on that section, placing the additional mass in communication with the shaft by means of at least one spring element which is effective in the peripheral direction, and providing at least one fastening means which can be actuated while the shaft is rotating to produce a releasable connection operable to prevent relative rotation between the shaft and the additional mass.

One significant advantage of this arrangement is that the pivotal, or angular, displacement of the additional mass with respect to the eccentric mass can be effected in a simple manner by changing the rotation speed with the fastening means released. The angular position between the two masses will then be substantially determined by the spring acting in the peripheral direction since a particular equilibrium state will be established, for each rotational speed value, between the reaction force of the spring and the centrifugal moment acting on the additional mass in a manner determined by the characteristic curve of the spring and the range of possible angular displacement.

Once such setting has been made, the fastening means will be operated to again produce a connection which prevents further angular displacement between the additional mass and the driven shaft. Now the eccentric drive can be operated at its intended operating speed, which can be different from the "adjustment" speed, so that any desired excitation force can be set for every operating speed, and thus for every operating frequency, over a range determined by the sizes of the two masses and the limits of the possible adjustment path between the eccentric mass and the additional mass. Thus it is possible to operate the drive at low speeds with a high or low excitation force and at high speeds with a high or low excitation force.

A particular advantage of the arrangement according to the invention is that the relative angular position setting process for the additional mass is independent of the direction of rotation, i.e. it is not necessary to consider, either during operation or during installation of the eccentric drive system, the direction of rotation of the motor and, with devices where the direction of rotation cannot be controlled, the direction of rotation that has been used for setting the desired angular position.

Depending on existing space limitations, the spring element may be a helical spring, a bending spring or a torsion spring. According to a particularly favorable embodiment of the invention, however, use is made of a helical spring, particularly a coil spring. This has the advantage that the additional mass can be angularly displaced with respect to the eccentric mass over a range of about 180°, i.e. at one end of the range a setting can be produced at which the centrifugal force produced by the additional mass counteracts the centrifugal force produced by the eccentric mass and at the other end of the range a setting can be produced at which the centrifugal forces produced by both masses are practically added to their full extent.

The moment arm of the centrifugal force acting on the additional mass as a result of the magnitude of the eccentricity involved changes depending on the size of the available adjustment angle for the additional mass and the starting position of the additional mass in the rest state, i.e. the position of the mass when the system is at rest. The resulting curve of the centrifugal moment, which progressively increases in dependence on the rotation speed, can additionally be influenced by appropriate selection of the spring element characteristic. It is of advantage, in this connection, to have the point of connection of the spring element to the shaft, particularly when a helical spring is being used, made displaceable in the peripheral direction and fixable at any desired position. This makes it possible to impart a certain initial bias to the spring so that the adjustment process need be effected only after a minimum rate of rotation has been reached.

According to a further embodiment of the invention, the fastening means produce a locking action by exerting a bearing force against a contact surface which is connected with the additional mass. This permits adjustment of the angular position of the additional mass with respect to the eccentric mass to be made over a continuous range so that it is possible to effect a very precise setting. It is, however, necessary that the contact force exerted by the fastening means be sufficiently forceful that neither the centrifugal moment nor the inertial forces resulting from the natural movement of the entire drive system and from external shocks can produce an unintentional displacement of the additional mass.

According to another embodiment of the invention, the fastening means act in a positive locking manner on a contact surface which is connected with the additional mass. This permits the realization of a rotationally secure connection, between the additional mass and the shaft, which acts independently of possibly occurring setting forces exerted by the force means, but also has the result that a position adjustment of the additional mass with respect to the shaft can only be made in steps determined by the shape of the locking members.

According to a further embodiment of the invention, the part of the fastening means which produces the locking force is designed to press against the additional mass in the axial direction. This design has the advantage that the contact force produced by the fastening means is generated independently of the rotation speed exclusively by the fastening means itself. This is of significance particularly for mechanically acting fastening means since at high rotation speeds substantial centrifugal forces may act on the individual actuating parts of the fastening means, which could impede release of the fastening means or keep it from remaining released during the setting process.

If, however, there are frequent setting operations for which the setting revolution rate is significantly below the operating speed, i.e. a significant centrifugal moment acts on the additional mass at the operating speed, then it is advisable to design the part producing the locking force, as provided in another embodiment of the invention, so that it can be placed against the additional mass in the radial direction since, with the appropriate dimensions, the contact pressure exerted by the actuating elements of the fastening means at increasing speeds is augmented by the resulting centrifugal force.

In both of the above-mentioned embodiments, the pressure surface for the fastening means may be given a smooth or profiled shape where it contacts the additional mass. For fastening means having a pressure surface which presses against the contact surface of the additional mass in an elastic manner, it is advisable to combine both features in such a manner that the contact surface has a slightly undulating form to assure that during unavoidable relative movement between a contact surface and a pressure surface of the fastening means no damage will occur to the pressure surface during release of the fastening means and that, on the other hand, when the additional mass is being locked by the fastening means, the inevitable deformation of the pressure surface resulting from bearing contact with the contact surface will result in a form-locking connection.

According to a particularly advantageous embodiment of the invention, the shaft is provided with an axial bore to accommodate a force transmitting means, e.g. mechanical rods, to actuate the fastening means. According to a particularly advantageous further embodiment, the axial bore is in communication with an apparatus constituting a source of oil under pressure, which oil constitutes the force transmitting means. A particular advantage of this embodiment is further that, if required, the contact pressure of the fastening means can be correspondingly increased with increasing rotation speeds by an increase in the oil pressure.

It is particularly advantageous in this connection for the axial bore to be in communication with the interior of a variable volume chamber whose movable wall portions act on the fastening means. In addition to the use of chambers which act in the manner of piston-cylinder units, this arrangement permits the use of chambers made of an elastic material whose interior is completely pressure-tight with respect to the remaining parts of the drive system and can thus be connected to the axial bore in a manner to be sealed against oil leaks. According to a particularly advantageous embodiment, the fastening means is formed by a variable volume chamber whose interior communicates with the axial bore. The variable volumn chamber is in fixed communication with the shaft and part of its movable outer surface, when under pressure, directly contacts the contact surface of the additional mass. This embodiment has the advantage that the fastening means is entirely free of play, and has few movable masses and is thus not subject to wear either under the influence of the centrifugal forces or under the influence of the inertial forces resulting from the periodic natural movement of the drive system itself. According to a further embodiment, that portion of the chamber walls which comes into contact with the contact surface is provided at least in part with a coating which increases its coefficient of friction and is resistant to wear.

According to a particularly advantageous embodiment of the invention, the fastening means are formed by a hollow, elastic sleeve which is fastened on the shaft section in a pressure-tight manner and whose interior is in communication, via at least one radial bore, with the axial bore in the shaft, the outer periphery of the sleeve being enclosed by a recess in the additional mass which serves as the contact surface.

According to a further embodiment, the recess is provided with at least one continuous leakage oil collection channel located adjacent the contact surface and provided with at least one radial discharge bore.

BRIEF DESCRIPTION OF THE DRAWING

FIG. 1 is an elevational, pictorial representation of the eccentric drive according to the present invention.

FIG. 2 is an axial, diagrammatic view illustrating the operation of the eccentric drive.

FIG. 3*a* is a frontal view of a special embodiment of a pressure plate.

FIG. 3*b* is a side, cross-sectional view of the pressure plate shown in FIG. 3*a*.

FIG. 5*a* is a frontal view of the bearing bore provided in the additional mass.

FIG. 6*a* shows an embodiment with adjustable abutment pin and spring fastening.

DESCRIPTION OF THE PREFERRED EMBODIMENTS

Figure 3:
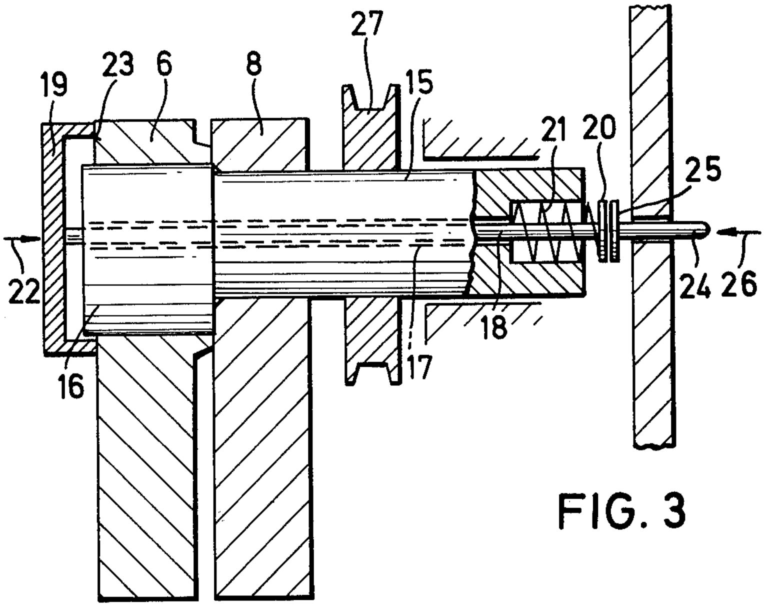
FIG. 3 is a side cross-sectional view of an embodiment of a drive according to the invention with axially acting fastening means.

FIG. 1 shows an eccentric drive which can have any desired use and which includes a driven shaft 1 connected to a drive motor 2 of any desired design. Shaft 1 is mounted on a foundation frame 3 which is supported by an elastic support 4. Such a drive may be used to excite vibrations in vibratory conveyors, vibratory screens or the like or as a vibratory drive for ground compactors or the like. The type of coupling provided depends on the particular use. Neither the particular coupling nor the particular field of use is of significance insofar as concerns the structure and operation of the eccentric drive according to the present invention.

Shaft 1 has a portion 5 which rotates as a unit with the shaft and whose peripheral surface is eccentric with respect to the axis of rotation of the shaft. On portion 5 an additional mass 6 is disposed which is schematically indicated as a concentrated mass. The additional mass 6 is mounted to be rotatable about shaft portion 5 and relative to shaft 1, as indicated schematically by mounting of mass 6 on a slide bearing sleeve 7. An eccentric mass is rigidly connected to shaft 1. In order to avoid wobbling, the mass in the present case is divided into two masses 8 and 8′ arranged symmetrically to both sides of shaft portion 5.

The additional mass 6 can be fixed relative to portion 5, and thus relative to shaft 1, by fastening means, several embodiments of which are shown in FIGS. 3 to 6, so that it is secured against rotation with respect to eccentric mass 8 after having been pivoted to assume a particular angular position relative thereto.

Looking in the direction of the axis of shaft 1, eccentric masses 8 and 8′ and additional mass 6 are shown in FIG. 1 to lie one behind the other, in one plane, i.e. with their centers of gravity on a common line parallel to the shaft axis. If shaft 1 now rotates at a given rate of revolution, a corresponding centrifugal force rotating at the same rate acts on the entire drive system resulting, depending on type of bearing and guidance of the supporting frame or of the device coupled to the supporting frame, respectively, in a circular, elliptical or linear oscillatory movement of the entire arrangement. If the rate of rotation is increased, the centrifugal force, and thus the excitation force for the connected device, increases correspondingly, and simultaneously the excitation frequency also increases.

If it is now desired to operate at an increased excitation frequency, but with a reduced excitation force, this can be achieved by rotating, or pivoting, the additional mass 6 with respect to the eccentric mass 8, 8′ until, at the operating speed corresponding to the increased frequency the resultant centrifugal force due to the eccentric mass and the additional mass corresponds to the desired excitation force value.

The adjustment process will be explained in detail with the aid of the simplified pictorial view of FIG. 2, which is an axial view to a larger scale than FIG. 1. In FIG. 2, the various bearings and support frame are not shown for the sake of clarity. The shaft 1 is mounted for rotation about an axis $M_w$, while portion 5 has a circular periphery but is positioned eccentrically to the axis of shaft 1 so that the central axis $M_e$ of portion 5 is spaced from axis $M_w$ by a distance $e$ constituting the amount of eccentricity. Portion 5 is fixed to shaft 1 and hence rotates about axis $M_w$. Bearing ring 7 is rotatably mounted on shaft portion 5 and the additional mass 6 is fastened to this bearing ring. The eccentric mass 8 is connected directly with shaft 1.

The additional mass 6 is further connected with shaft 1 via a spring element 9 acting in the peripheral direction of the shaft, one end of spring 9 being shown schematically to be attached to a holding rod 10 fixed to shaft 1. The other end of the spring element 9 is connected directly to the additional mass 6.

In the interior of shaft portion 5 there is disposed a fastening means 11 arranged to be acted on by an outwardly, radially acting fastening force 12 which is externally controlled. The fastening means 11 engages the bearing ring 7 radially from the inside.

With the system at rest and with fastening means 11 released, i.e. with force 12 removed, the additional mass 6 is initially brought to, and held at, its rest position A by spring element 9. If now shaft 1 rotates at a selected rate, a corresponding centrifugal force acts on the eccentric mass 8 as well as on the additional mass 6. Only the influence of the centrifugal force $F_z$ acting on the additional mass 6 need be considered in detail below.

The direction of the centrifugal force $F_z$ is along a line 13 between the center of gravity of the additional mass 6 and the axis of rotation $M_w$. Since, however, the additional mass 6 is mounted on bearing ring 7 to be freely rotatable relative to portion 5 about axis $M_e$ if the fastening means 11 is released, the torque acting on the additional mass, hereinafter called centrifugal moment, whose magnitude is determined by the magnitude of the centrifugal force $F_z$ and by the normal distance $r$ between axis $M_e$ and line 13, tends to rotate the additional mass 6 in the direction of arrow 14 on shaft portion 5 until equilibrium is established between the tangential force produced by the centrifugal moment and the restoring force imposed on the additional mass by spring element element 9.

Then a centrifugal force R which is the resultant of the centrifugal force F due to eccentric mass 8, 8′ and the centrifugal force $F_z$ acts on the entire system at the given rate of rotation and the effective directions of centrifugal force F and of centrifugal force $F_z$ enclose a corresponding angle with one another. This angle is maintained as long as the shaft rotates at the given rate.

If now the fastening means 11 is pressed against bearing 7 of the additional mass by the application of fastening force 12, this establishes a rotationally secure connection between additional mass 6 and shaft 1 and thus also with eccentric mass 8, 8′ and fixes the angular distance, or angle, between eccentric mass 8, 8′ and additional mass 6.

Now the shaft can be operated at any desired speed at the given angular setting between the two masses, while any change in this angular setting is prevented. This makes it possible to operate the eccentric drive system, within the limits given by its structure, at any desired operating frequency and to set, for any desired operating frequency, a resulting centrifugal force of any desired size, and thus an excitation force within the limits given by the dependence of total eccentric mass and rate of rotation.

The above explanation clearly shows, moreover, that setting of the system is independent of the direction of rotation, i.e. the angular setting between the eccentric mass and the additional mass can be effected with the shaft 1 rotating either clockwise or counterclockwise.

Since, in practice, the geometric values, i.e. the value of the eccentricity e, the distance of the centers of gravity of the two masses from the axis of rotation $M_w$, as well as the size of the masses and the spring characteristic are known, the angle between F and $F_z$ for each setting speed can be established once a particular system has been correspondingly calibrated. Based on the given structural data, it is further possible to associate each angular setting between the two masses with the magnitude R of the resultant centrifugal force, i.e. the excitation force for the respective case of operation, in the form of tables or families of curves.

It will thus be seen that for practical operation, for example in ground compactors, changes that might be required in the excitation force and excitation frequency can be effected in a simple manner and in a very short time.

Figure 4:
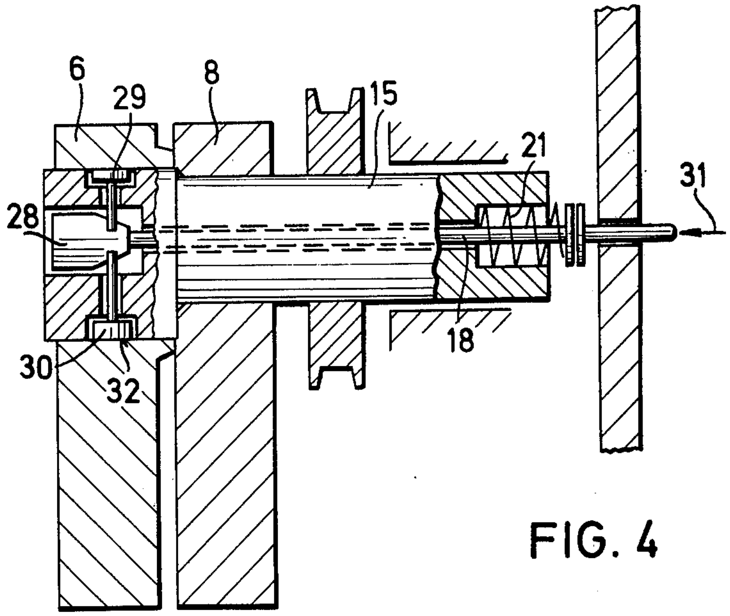
FIG. 4 is a view similar to that of FIG. 3 of an embodiment of the drive according to the invention with radially acting fastening means.

FIGS 3 and 4 illustrate two advantageous embodiments of the fastening means. In the embodiment of FIG. 3 an eccentric mass 8 is rigidly connected to a floating shaft 15. The free end of shaft 15 is provided with a shaft portion 16 whose periphery is circular but eccentric to the axis of shaft 15 and on which an additional mass 6 is rotatably mounted. Shaft 15 has an axial through bore 17 through which an actuating rod 18 passes in the axial direction. The end of actuating rod 18 in the region of the masses is connected with a pressure plate 19 while the other end of rod 18 terminates in a holding collar 20. A spring element 21, for example a spiral compression spring, urges the actuating rod 18, and thus the pressure plate 19, in the direction of arrow 22 against a corresponding contact surface 23 of additional mass 6. Since the actuating rod 18, which is here shown only schematically, is guided in shaft 15, in a manner not shown here in detail, so that it will rotate as a unit with shaft 15, there results, via pressure plate 19, a rotationally secure connection between shaft 15 and additional mass 6.

Via an actuating element 24 which has one end provided with a slide disc 25 which can be pressed against the holding collar 20 in the direction of arrow 26, the fastening unit composed of spring element 21, rod 18 and pressure plate 19 can be released to permit the additional mass 6 to rotate, or pivot, freely on shaft section 16 with respect to eccentric mass 8. A spring element, which is not shown here and which corresponds in its effect to the arrangement of spring element 9 of FIG. 2, is used to set the angular position between additional mass 6 and eccentric mass 8 in dependence on the rate at which shaft 15 is rotated once the fixing means are released, and once actuating pin 24 is subsequently released, mass 6 can again be secured against rotation on shaft 15 by engagement of pressure plate 19 against mass 6. In the illustrated embodiment, mass 6 is effectively clamped between pressure plate 19 and mass 8 to prevent relative rotation between masses 6 and 8.

Pressure plate 19 and the associated contact surface 23 presented by the additional mass 6 may here have smooth surfaces and at least one of the contacting surfaces should be formed to provide a high coefficient of friction between the surfaces. Alternatively, they may be given profiles, for example in the form of radially-extending, circumferentially spaced teeth. The pressure force acting via the spring element 21 on the additional mass 6 must produce a strong enough friction force, in the case of a friction locking connection, so that it will be able to absorb the maximum centrifugal moment acting on the additional mass 6 over the permissible speed range. With a profiled connection, for example a toothed contact surface 23, and a corresponding design of the countersurface on pressure plate 19, the stability of this connection must be matched in the same manner to the maximum centrifugal moment as well to all other impact acceleration moments.

In the illustrated embodiment the driving energy for rotating shaft 15 is transmitted, for example, via a V-belt pulley 27.

While in the embodiment of FIG. 3 the fastening means acts in the axial direction, FIG. 4 shows an embodiment in which the fastening means acts radially on the additional mass 6. Since, for reasons of simplicity, the actuating elements are shown to be identical in this embodiment with those of the embodiment of FIG. 3, only the changed parts will be described in detail. Identical parts are given identical reference numerals.

In the embodiment shown in FIG. 4, the end of the actuating rod 18 at the side of the masses has fastened to it a guide wedge 28 operatively associated with two radially guided plungers 29 and 30. When actuating rod 18 is displaced in the direction of arrow 31, the free ends of plungers 29 and 30 are pulled radially inwardly by means of guide wedge 28 and thus the locking connection between the fastening means and additional mass 6 is eliminated. The additional mass 6 can then rotate freely with respect to eccentric mass 8.

If the actuating rod 18 is moved in the direction opposite to the arrow 31 by spring element 21, the guide wedge 28 pushes the two plungers 29 and 30 radially outwardly against the inner wall 32 of the bearing bore in the additional mass 6 and the latter is again rotationally securely connected with shaft 15. Here, again, the contact surface 32 at the additional mass 6 may be smooth or profiled.

With radially acting fastening means it must be considered in any case that centrifugal forces also act on the individually radially movable parts of the fastening means in the same manner so that care must be taken that during release the retraction of these parts in the radially inward direction will take place as a matter of course. This can be assured by a positive camming relation between plungers 29 and 30 and wedge 28. In this embodiment there is also provided a spring element (not shown) which acts on additional mass 6 in the same manner as the spring element 9 of FIG. 2.

The embodiments shown in FIGS. 3 and 4 for the arrangement, structure, operation and actuation of the fixing means are shown purely schematically and constitute only exemplary solutions which must be modified to fit the particular use, the required performance and the arrangement in question, e.g. depending on whether shaft 15 is floating or is mounted at both ends.

For example, instead of pressure plate 19 or plungers 29 and 30, respectively, variable volume chambers may be provided which are in communication with the axial bore 17, a hydraulic fluid then taking the place of the actuating rod 18 as the force transmitting means. The parts of the chamber walls which are in contact with the additional mass 6 can then be pressed against the contact surface of the mass by means of an appropriate hydraulic pressure and the rotationally secure connection between the additional mass and the shaft can be produced in this way. The pressure chambers may, as indicated above, contact the contact surface of the additional mass 6 either directly, or via appropriate intermediate elements which transfer the fastening force to the additional mass 6.

Figure 5:
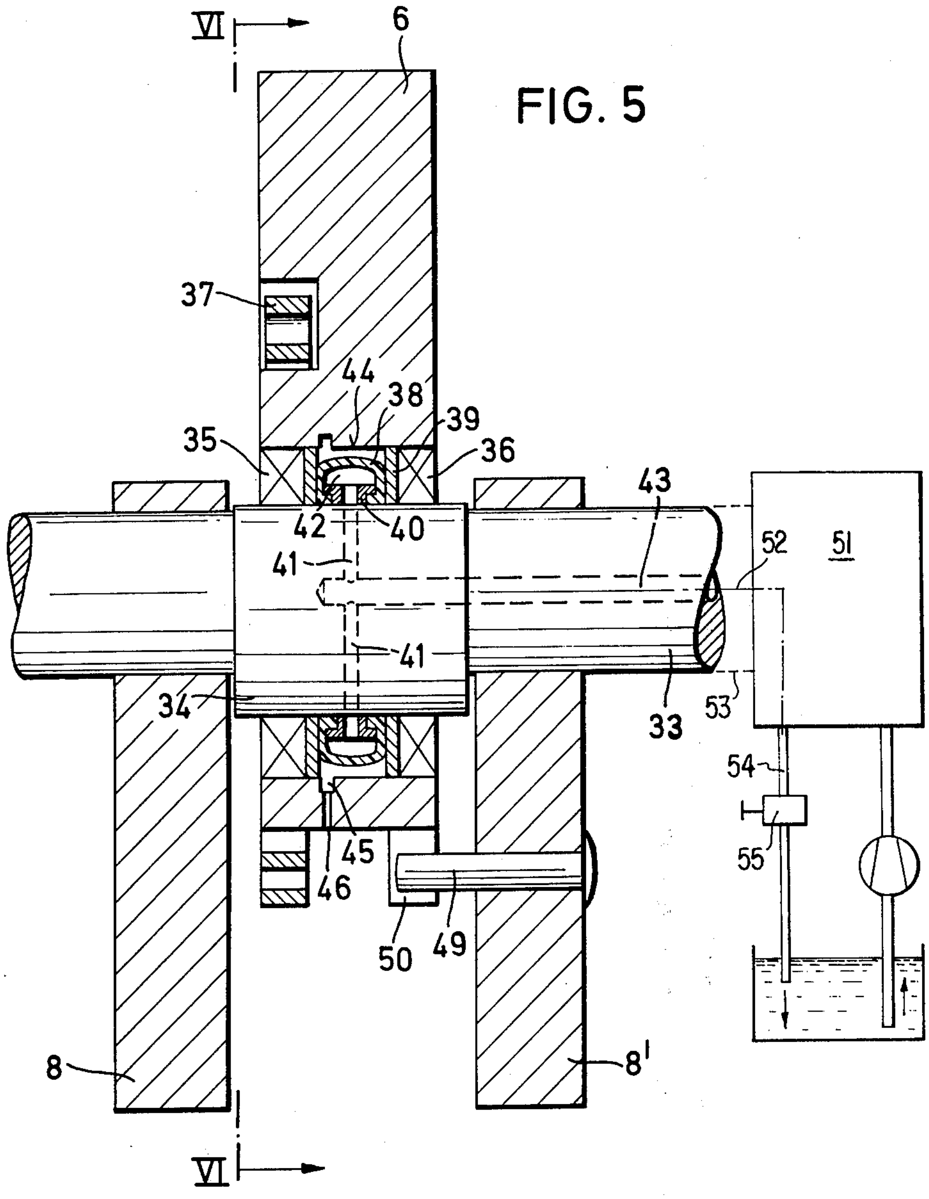
FIG. 5 is a side, cross-sectional detail view of a portion of a further embodiment of the drive according to the invention with a radially acting, hydraulically actuated fastening means.
Figure 6:
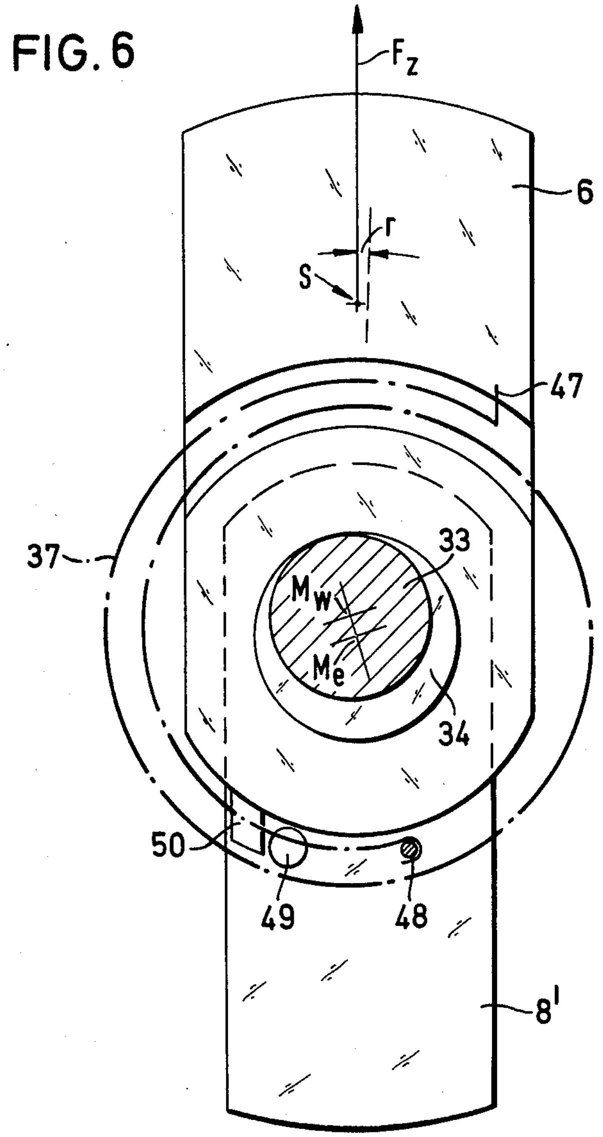
FIG. 6 is a cross-sectional view taken along the line VI—VI of FIG. 5.

FIGS. 5 and 6 show a preferred embodiment of an eccentric drive system of the above-described type. In this embodiment, an eccentric mass formed of two eccentric masses 8 and 8' is firmly attached to a shaft 33 which is either floating, i.e. mounted at only one end, or mounted at both ends. Between the two eccentric masses 8 and 8' shaft 33 is provided with a shaft portion 34 having a circular periphery which is eccentric to the shaft axis $M_w$. An additional mass 6 is mounted on shaft portion 34 via bearings 35 and 36 to be freely rotatable relative to portion 34. A helical coil spring 37 has one end firmly connected, i.e. fixed, to the additional mass 6 and its other end firmly connected, for example, to the eccentric mass 8, to connect the additional mass 6 to shaft 33 in a manner to exert a reaction force in the peripheral direction.

In this embodiment an elastic, expansible sleeve 38, which is firmly connected to shaft portion 34 by annular clamping pieces 39 and 40, is provided to constitute a variable volume chamber. The interior 42 enclosed by sleeve 38 is in communication with an axial bore 43 in shaft 33 via radial bores 41 in portion 34. If, now, the interior 42 is charged with a pressure fluid supplied via bores 41 and 43, sleeve 38 expands to come into annular contact with the entire periphery of the contact surface 44 defined by the bearing bore provided in the additional mass 6. The outer surface of sleeve 38 then acts as a fastening means on additional mass 6 so that the latter can be held in any desired angular position between about 180° and, depending on the size of the mass, about 0° with respect to the eccentric mass 8. In order to release the fastening means, the hydraulic pressure in bores 41 and 43 is lowered so that sleeve 38 contracts and thus frees the additional mass 6 for rotation relative to shaft portion 34.

The variable volume chamber formed by sleeve 38 can be considered to be, in principle, pressure tight. In order to assure perfect fastening of the additional mass even in a case where pressure oil excapes from the interior 42 of sleeve 38, an annular oil leakage collection channel 45 is provided in contact surface 44 and is provided at at least one point with a radial discharge bore 46 so that when oil leaks into the space between sleeve 38 and contact surface 44 it can be ejected through oil leakage collection channel 45 and discharge bore 46.

In the simplified frontal view of FIG. 6, the position of additional mass 6 with respect to eccentric mass 8, 8' is shown schematically in the rest position of the system, i.e. the position assumed when the shaft is halted and the fastening means are released. In this illustration, to facilitate understanding the structural details of FIG. 5 are not shown The axial view of FIG. 6 shows that the helical spring 37 has its outer end 47 fastened to the additional mass 6 while its inner end 48 is fastened to the eccentric mass 8 and thus to shaft 33.

In the relative positions shown in FIG. 6, the eccentric mass 8 and additional mass 6 counteract one another, i.e. when the shaft rotates, the centrifugal force produced by additional mass 6 is directed opposite to that of mass 8 and if the masses are dimensioned so that the force produced by mass 6 is equal to the total of forces produced by masses 8 and 8' no vibration will result. The position of the axis of rotation $M_w$ with respect to the axis of eccentricity $M_e$ and thus the angular position of the eccentric shaft portion 34 with respect to the two masses is such that the connecting line between $M_w$ and $M_e$ forms an angle with a base line passing through the centers of gravity of the two masses. As a result, the vector of the centrifugal force $F_z$, which passes through the center of gravity S of the additional mass 6 and through the axis $M_w$, is spaced by a distance $r$ from a line passing through the axis $M_e$ of the shaft section 34 and extending parallel to the $F_z$ vector. This distance $r$ constitutes the moment arm of a centrifugal moment produced by mass 6 when the drive is rotating and this moment tends to rotate the additional mass 6 clockwise, with respect to the eccentric mass 8. Such relative rotation will be opposed by the resulting restoring force produced by spring 37.

The basic, i.e. rest position, setting of additional mass 6 and eccentric mass 8 with respect to each other may be as desired, i.e. at an angle of less than 180°, and this basic setting can be fixed, for example, by an abutment pin 49 carried by the eccentric mass 8' and a corresponding abutment tongue 50 carried by additional mass 6. The abutment means formed by abutment pin 49 and abutment tongue 50 can here also be designed to be adjustable, if this is required by particular conditions, so that different angular starting, or rest, positions can be established, as required, between additional mass 6 and eccentric mass 8'.

In the same manner, helical spring 37 may be designed to have a variable initial tension, in the rest position setting, for example, in that the point of fastening 48 to additional mass 8' can be shifted on the latter.

While in FIG. 6 the two mutually displaceable masses are shown in their counteracting position as the starting position, the starting position may also be the addition position, i.e. the eccentric mass as well as the additional mass are both oriented in approximately the same direction so that their centrifugal forces will be added together. Here, again, the adjustment of the eccentric portion 34 with respect to the rest position must be made in such a manner that a centrifugal moment acting on the additional mass 6 during rotation of shaft 33 can act to initiate the adjustment process.

The helical spring 37 shown in the embodiments of FIGS. 5 and 6 as a connecting spring element between the rotatable additional mass 6 and the driven shaft 33 constitutes a particularly advantageous embodiment which permits adjustments over the widest angular range. Such an arrangement can be advantageously employed in the embodiments of FIGS. 3 and 4. Since the helical spring is practically symmetrical, it is influenced only to a slight degree by the centrifugal force acting on it when the shaft is rotating. If smaller adjustment ranges are to be provided between the additional mass 6 and the eccentric mass 8, 8', it is also possible to use spiral compression or tension springs, bending springs, gas spring elements, or the like.

The generation of pressure oil can, in principle, be effected by any suitable oil pressure generator. According to a particularly advantageous embodiment shown in FIG. 5, however, shaft 33 is driven by a hydraulic motor 51 flanged to one end of the shaft and an appropriate axial bore 43 in shaft 33 is placed in communication with the oil leakage chamber (not shown) of the hydraulic motor 51. This can be effected in a simple manner by a corresponding axial bore 52 in the drive shaft 53 of the hydraulic motor both schematically shown.

If now the leakage oil discharge 54 from the motor 51 is blocked by means of a valve 55, advisably by means of a valve provided with a pressure limiter, a pressure will develop in a very short time, with the motor running, within the leakage oil chamber, which pressure is sufficient to bring sleeve 38 into contact with the additional mass 6 to act as a fastening means. If the valve is then opened and the motor is brought to a selected operating speed, the oil pressure drops and the sleeve will be released so that the additional mass 6 can freely set itself to a relative angular position corresponding to the existing rate of shaft rotation.

The particular advantage of this embodiment is that the difficult transition from a stationary pressure oil line to the axial bore rotating with the shaft is eliminated. The axial bore in the shaft can be connected to the axial bore of the drive shaft of the hydraulic motor by means of a suitable coupling while the axial bore of the drive shaft opens freely into the leakage oil chamber of the hydraulic motor.

If a previously selected setting is to be maintained even over a long period of rest after the hydraulic motor has been shut off, it is advisable to provide a switching arrangment which permits the temporary connection of the axial bore 43 to a reservoir fed by the pressure oil supply for the hydraulic motor or to another external pressure source.

If the pressure obtained with the leakage oil should not suffice for actuation of the fastening means, it is likewise advisable to connect a separate pressure oil source to the axial bore 43 via the drive shaft of the hydraulic motor since then the otherwise difficult transition from a stationary feeder line to the rotating shaft can be transferred to the leakage oil chamber of the hydraulic motor. The embodiment of pressure plate 19' shown in FIGS. 3*a*, 3*b* is on its side facing the corresponding contact surface 23' performed with several teeth 56, which can be engaged with the corresponding teeth 57 of the contact surface 23'. By this or similar embodiments can be performed the positive locking manner for securing the additional mass 6 on the shaft 15. In FIG. 5*a* is shown in a frontal view the bearing bore of an other embodiment of additional mass 6 according to the embodiment of FIG. 5. Instead of the cylindrical contact surface, as shown in FIG. 5, this embodiment has a contact surface 44' of a profiled shape. The contact surface 44' has a slightly undulating form of a few millimeters. By this way it is possible to perform a sort of positive locking manner even if elastic fastening means are used. The embodiment shown in FIG. 6*a* has an abutment pin 49', which is adjustable by a line of fastening holes 58, which can be selected for fastening pin 49' e.g. by a nut. The fastening point 48' can be shifted and fastened in a slotted hole 59 for adjustment purposes too.

It will be understood that the above description of the present invention is susceptible to various modifications, changes and adaptations, and the same are intended to be comprehended within the meaning and range of equivalents of the appended claims.

What is claimed is:

1. In an eccentric drive system including a rotatably mounted driven shaft, at least one primary eccentric mass fixed to the driven shaft for rotation therewith, an additional eccentric mass mounted for rotation with the shaft in a manner to permit adjustment of the angular position of the additional mass relative to that of the primary mass, the improvement wherein: said shaft is provided with a shaft portion presenting an outer periphery which is arranged eccentrically to the axis of rotation of said shaft; said additional mass is mounted on said portion to be angularly movable relative to said portion; and said system comprises spring means connected between said additional mass and said shaft for producing a force about the axis of said shaft urging said additional mass into an initial angular position relative to said shaft, and fastening means disposed between said shaft and said additional mass and actuatable between a released position in which it permits said additional mass to undergo such angular movement relative to said shaft portion and a locking position in which it prevents such movement, said fastening means including actuating means operable during rotation of said shaft for effecting actuation of said fastening means between its said positions.

2. An arrangement as defined in claim 1 wherein said spring means comprises a coil spring.

3. An arrangement as defined in claim 1 wherein the outer periphery of said shaft portion is circular, and the center of its circular periphery is spaced from the axis of rotation of said shaft in a direction such that movement of said additional mass in opposition to the force provided by said spring means during rotation of said drive system is accompanied by movement of the center of gravity of said additional mass in a direction having a radial component directed away from the axis of rotation of said shaft.

4. An arrangement as defined in claim 1 wherein said additional mass presents a contact surface and said fastening means are arranged to establish a locking contact with said contact surface when said fastening means is in its said locking position.

5. An arrangement as defined in claim 4 wherein said shaft is provided with an axial bore extending from one end thereof to the region of said shaft portion, and said actuating means are disposed in said shaft bore.

6. An arrangement as defined in claim 5 wherein said fastening means is constituted by hydraulically actuated unit, said actuating means are constituted by a mass of oil under pressure, and said axial bore is arranged to be placed in communication with a source of oil under pressure.

7. An arrangement as defined in claim 6 wherein the source of pressure oil is constituted by the leakage oil chamber of a hydraulic motor, said axial bore being in communication with said leakage oil chamber, and said leakage oil chamber being provided with a lockable discharge opening.

8. An arrangement as defined in claim 7 further comprising means for establishing a regulated blocking pressure at said discharge opening.

9. An arrangement as defined in claim 6 wherein said fastening means comprise an elastic member defining a variable volume chamber in communication with the interior of said bore and disposed to press against said contact surface of said additional mass, to define said locking position of said fastening means under the influence of pressure oil in said bore.

10. An arrangement as defined in claim 9 wherein said elastic member is secured to said shaft and is arranged to bear directly against said contact surface in the locking position of said fastening means.

11. An arrangement as defined in claim 10 wherein at least part of said elastic member is made of a stretchable material.

12. An arrangement as defined in claim 10 wherein at least part of the surface of said elastic member which is arranged to contact said contact surface is provided with a wear resistant coating of a material providing a high coefficient of friction with said contact surface.

13. An arrangement as defined in claim 10 wherein said additional mass is provided with an interior recess one boundary of which defines said contact surface, said elastic member is disposed within said recess and is fastened in a pressure tight manner to said shaft portion, and said shaft portion is provided with at least one radial bore extending between said axial bore and the interior of said elastic member.

14. An arrangement as defined in claim 13 wherein said additional mass is provided with a hydraulic fluid collection channel communicating with said recess, and with at least one radial discharge bore communicating between said channel and the region external to said additional mass.

* * * * *